United States Patent
Jeon et al.

(10) Patent No.: US 8,059,626 B2
(45) Date of Patent: Nov. 15, 2011

(54) OPTIMUM RESOURCE ALLOCATION METHOD AND SYSTEM IN MEDIUM ACCESS CONTROL OF DISTRIBUTE SCHEME IN WIRELESS PERSONAL AREA NETWORK

(75) Inventors: Young Ae Jeon, Daejeon (KR); Sang Jae Lee, Daejeon (KR); Sang Sung Choi, Daejeon (KR); Kwang Roh Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 998 days.

(21) Appl. No.: 11/949,739

(22) Filed: Dec. 3, 2007

(65) Prior Publication Data

US 2008/0130567 A1   Jun. 5, 2008

(30) Foreign Application Priority Data

Dec. 4, 2006 (KR) .................. 10-2006-0121318
Jul. 4, 2007 (KR) .................. 10-2007-0067267

(51) Int. Cl.
*H04W 72/00* (2009.01)
(52) U.S. Cl. .................... 370/341; 370/443
(58) Field of Classification Search .............. None
See application file for complete search history.

(56) References Cited

U.S. PATENT DOCUMENTS

| | | | |
|---|---|---|---|
| 7,092,374 B1 * | 8/2006 | Gubbi | 370/338 |
| 7,424,001 B2 * | 9/2008 | Kim et al. | 370/338 |
| 7,613,257 B2 * | 11/2009 | El Fawal et al. | 375/343 |
| 2003/0152059 A1 | 8/2003 | Odman | |
| 2004/0156312 A1 | 8/2004 | Salonidis et al. | |
| 2007/0127410 A1 * | 6/2007 | Guo et al. | 370/328 |

FOREIGN PATENT DOCUMENTS

| | | |
|---|---|---|
| KR | 1020020027214 | 4/2002 |
| KR | 2006-0047702 | 5/2006 |
| KR | 1020060038786 | 5/2006 |
| KR | 1020060061016 | 6/2006 |
| KR | 1020060069141 | 6/2006 |
| KR | 1020060102895 | 9/2006 |
| KR | 2006-0122908 | 11/2006 |
| KR | 2007-0019724 | 2/2007 |
| WO | WO-01/89153 | 11/2001 |

* cited by examiner

*Primary Examiner* — Kwang B Yao
*Assistant Examiner* — Alex Skripnikov
(74) *Attorney, Agent, or Firm* — Rabin & Berdo, P.C.

(57) ABSTRACT

Provided is an optimum resource allocation method in distributed medium access control in a wireless personal area network, including: defining needed parameters in advance; calculating an overhead AckOverhead needed for an acknowledgement policy and calculating an overhead MasOverhead generated per medium access slot by using the calculated overhead AckOverhead and an amount of the medium access slots which remain after transmitting a frame; calculating the number of frame bits to be transmitted per superframe; determining the number of medium access slots primarily needed per the superframe by using the calculated number of frame bits and the calculated overhead MasOverhead generated per the medium access slot; and optimizing the number of medium access slots finally needed per the superframe.

12 Claims, 6 Drawing Sheets

OPTIMUM RESOURCE ALLOCATION METHOD AND SYSTEM IN MEDIUM ACCESS CONTROL OF DISTRIBUTE SCHEME IN WIRELESS PERSONAL AREA NETWORK

CROSS-REFERENCE TO RELATED APPLICATIONS

This application claims the priority of Korean Patent Application No. 10-2006-121318 filed on Dec. 4, 2006, and No. 10-2007-67267 filed on Jul. 4, 2007, in the Korean Intellectual Property Office, the disclosure of which is incorporated herein by reference.

BACKGROUND OF THE INVENTION

1. Field of the Invention

The present invention relates to an optimum resource allocation method and system in medium access control (MAC) of distribute scheme in a wireless personal network (WPAN), and more particularly, to a method and system for optimizing resource allocation by determining the number of medium access slots (MASs) needed to prevent waste of wireless resources.

This work was supported by the IT R&D program of MIC/IITA [2006-S-071-01, Development of UWB Solution for High Speed Multimedia Transmission]

2. Description of the Related Art

Wireless personal area network (WPAN) is a technology that enables wireless connectivity between devices such as audio/video devices, computers, and peripheral devices within about 10 meters and supports communication between portable small-sized (multimedia) devices with a lower power so as to support various services.

In medium access control (MAC) of WiMedia Alliance, which is distributed MAC in the WPAN, each of devices DEVs basically transmits its own beacon frame, analyzes beacon frame information on neighboring devices to control basic timing between the neighboring devices, and distributes quality of service (QoS), a hibernation mode, and security in order to operate itself.

The MAC in the WPAN has a superframe structure. The superframe includes a beacon period (BP) and a data period (DP). The BP includes beacon time slots (BTSs) in units of 85 µs, and the DP includes medium access slots (MASs) in units of 256 µs.

Unlike a scheme in which network management is centralized by a specific device, in the existing MAC, network management is performed by each device, so that network construction is easily performed in a wireless environment in which devices are frequently connected and disconnected. A network in which each device is connected to neighboring devices is illustrated in FIG. 2. Each device selects a BTS which is not used from among a number of BTSs and transmits its own beacon frame. The beacon frame of each device includes device (DEV) identifier (ID), BTS information about the device, medium usage information, and the like.

In addition, the devices negotiate with each other to reserve MASs of the DPs by using information elements (IE) in the beacon frames in the BPs or command frames in the DPs, so that competition and collision of transmitted data in the DPs can be prevented.

However, the existing MAC has problems in that each device has to analyze a large amount of information on the neighboring devices, and it takes much time to search for a point of compromise and this may cause waste of resources.

Moreover, if not all of the devices have mechanisms of optimally allocating necessary wireless resources, the wireless resources in the entire wireless personal area network may be wasted severely.

SUMMARY OF THE INVENTION

An aspect of the present invention provides a method and system for optimizing resource allocation in distributed medium access control (MAC) in order to prevent waste of wireless resources in a wireless personal area network.

According to an aspect of the present invention, there is provided an optimum resource allocation method in medium access control of distribute scheme in a wireless personal area network, including: calculating an overhead AckOverhead needed for an acknowledgement policy; calculating an overhead MasOverhead generated per medium access slot by using the calculated overhead AckOverhead and an amount of medium access slots which remain after a frame is transmitted; determining the number of medium access slots primarily needed per superframe by using the calculated overhead MasOverhead generated per the medium access slot; and optimizing the number of medium access slots finally needed per superframe to allocate a resource.

According to another aspect of the present invention, there is provided an optimum resource allocation system in medium access control of distribute scheme in a wireless personal area network, including: a medium access client layer including a plurality of medium access clients and determining and requesting a resource allocation scheme and an amount of resource in order to support a particular service; a physical layer providing physical layer information including information on a reception state, a link quality state, and dynamic/static parameters; and a medium access control layer allocating an optimized resource in medium access control by using results obtained from information on the physical layer provided from the physical layer, and functions of rate adaptation, transmit power control, interference control, and transmit performance monitoring using information on the frame transmission state, according to the request from the medium access control client layer, wherein the medium access control layer primarily determines the number of medium access slots needed per superframe and optimizes the number of medium access slots finally needed per the superframe to allocate the resource.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
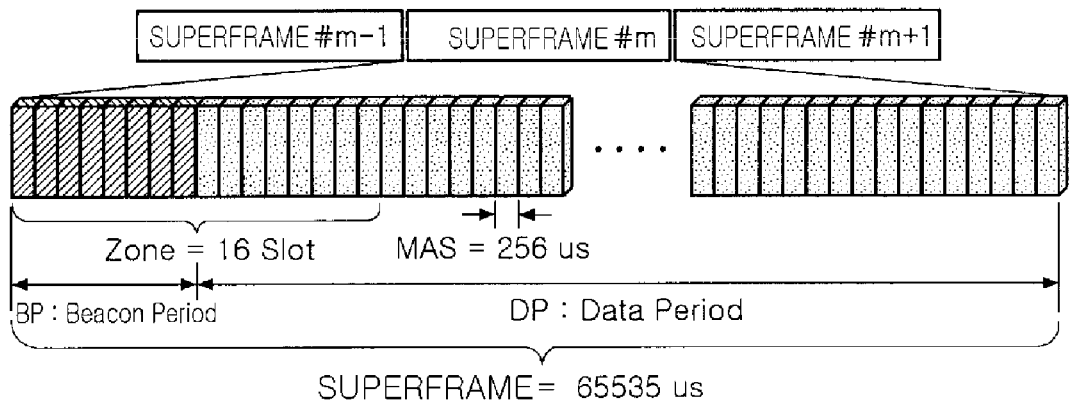
FIG. 1 is a view illustrating a structure of a superframe in medium access control (MAC) of distribute scheme in a wireless personal area network (WPAN)
Figure 2:
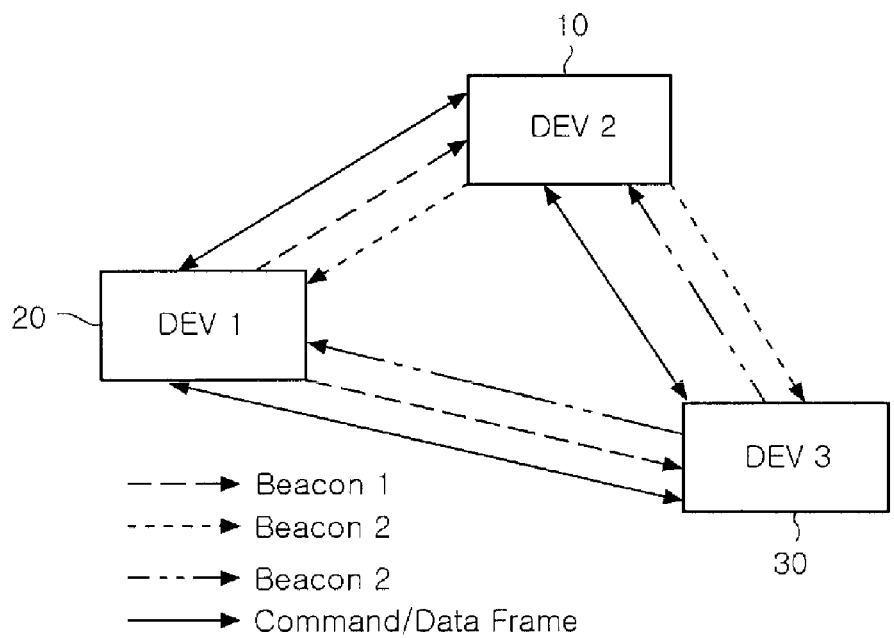
FIG. 2 is a view illustrating transmission/reception relationships of beacon frames, command frames, and data frames between neighboring devices in a WPAN.

Exemplary embodiments of the present invention will now be described in detail with reference to the accompanying drawings. Like reference numerals in the drawings denote like elements. In the description, the detailed description of well-known functions and structures may be omitted so as not to break the essentials of the present invention.

According to an embodiment of the present invention, in order to optimize resource allocation in medium access control (MAC) of distribute scheme in a wireless personal area network (WPAN), the number of medium access slots (MASs) primarily needed per superframe is determined, and the number of MASs finally needed per superframe is optimized.

Now, a structure of a resource allocation system for optimizing MAC resource allocation in a WPAN according to the embodiment of the present invention will be described in detail with reference to the attached drawings.

Figure 3:
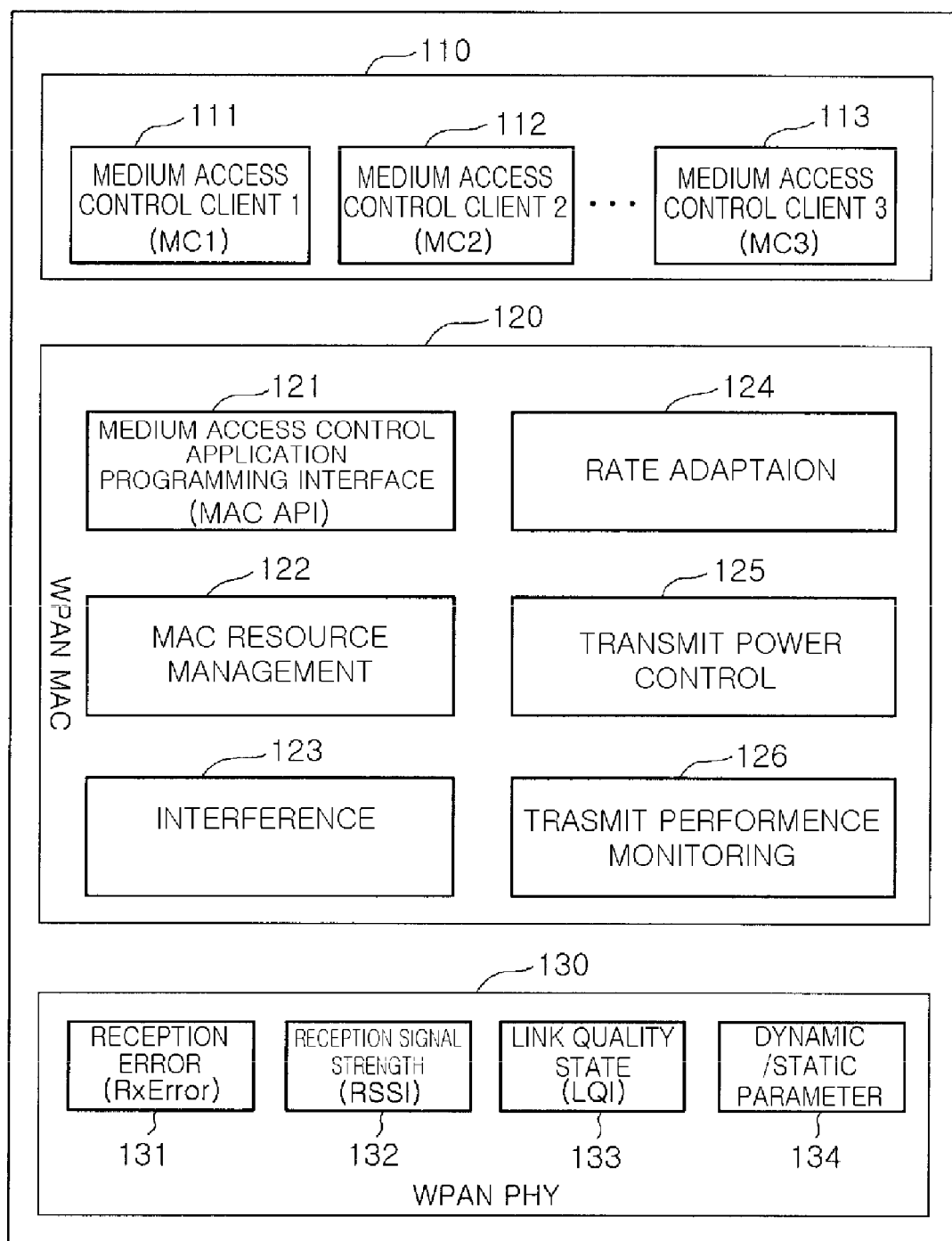
FIG. 3 is a view illustrating a structure of a resource allocation system in a WPAN according to an embodiment of the present invention.

FIG. 3 is a view illustrating the structure of the resource allocation system in the WPAN according to the embodiment of the present invention.

Referring to FIG. 3, the resource allocation system 100 in the WPAN includes a MAC client layer 110, a MAC layer 120, and a physical layer 130.

The MAC client layer 110 includes MAC clients 111 to 113, and each of the MAC clients 111 to 113 determines an appropriate resource allocation scheme and an amount of resource in order to support and request a particular service from the MAC layer 120.

The MAC layer 120 includes a MAC application programming interface (API) unit 121 and a MAC resource management unit 122 and has functions of interference control 123, rate adaptation 124, transmit power control 125, transmit performance monitoring 126, and the like. Here, the MAC API unit 121 optimally allocates a resource needed for the MAC resource management unit 122 in consideration of the functions 123 to 126 using accepted information, information provided from the physical layer 130, and information on transmission states that are perceived in various manners. In addition, the MAC layer 120 determines a payload length of a transmission frame, a data rate, an acknowledgement policy, an interframe space, a preamble type, and the like according to information supported by the physical layer 130 and requirements of the MAC client layer 110.

The physical layer 130 includes information such as a reception error 131, a reception signal strength 132, a link quality state 133, a dynamic/static parameter 134, and the like.

Now, a method of optimizing the MAC resource allocation performed by the resource allocation system having the aforementioned structure will be described in detail with reference to the attached drawings.

Figure 4:
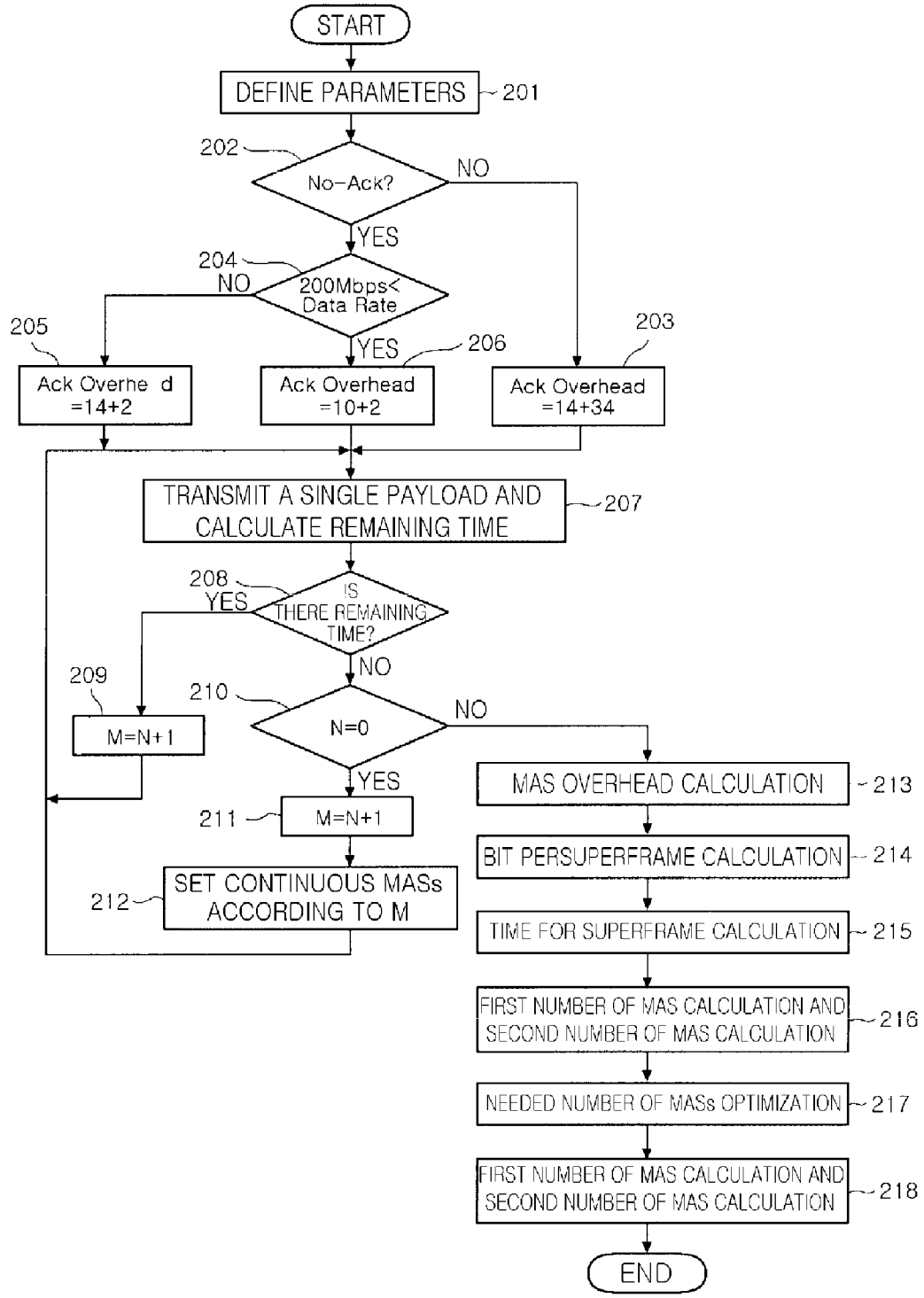
FIG. 4 is a view illustrating operations of determining the number of medium access slots (MASs) primarily needed per superframe performed by a resource allocation system according to an embodiment of the present invention.

FIG. 4 is a view illustrating operations of determining the number of medium access slots (MASs) primarily needed per superframe performed by the resource allocation system according to the embodiment of the present invention.

Referring to FIG. 4, in operation 201, the MAC layer 120 defines parameters needed to determine the number of MASs primarily needed per superframe. Here, the defined parameters may include a resource request allocation amount BW, the number N of frame transmissions, the number M of continuous MASs, a data rate, an acknowledgement policy AckPolicy, an interframe transmission mode, an overhead AckOverhead according to the acknowledgement policy AckPolicy, an amount MasR of MASs that remain after transmitting a frame, an overhead MasOverhead in a single or continuous MASs, an amount BitPerSuperframe of data to be transmitted per superframe, a time TimeForSuperframe to be allocated per superframe, the optimized number OptimizationNumberOfMAS of MASs per superframe, and the like.

In operation 202, the MAC layer 120 checks whether or not the acknowledgement policy AckPolicy is No_ACK and the interframe transmission mode is a burst mode in order to calculate an overhead needed according to the acknowledgement policy AckPolicy and the interframe transmission mode. As a result of the checking, when the acknowledgement policy AckPolicy is not the No_ACK and the interframe transmission mode is not the burst mode, the acknowledgement policy AckPolicy is Imm_Ack, and the interframe transmission mode is a normal burst mode. In operation 203, the MAC layer 120 calculates a value of the overhead AckOverhead according to a normal preamble type, and operation 207 is then performed. More specifically, the MAC layer 120 obtains the value of the overhead AckOverhead as 34 µs by adding 14 µs that is a preamble and physical layer convergence protocol (PLCP) header transmission time, 14 µs that is an Imm_Ack frame reception time after a short interframe space (SIFS), to 10 µs that is a time before a next frame transmission time.

On the other hand, as a result of the checking in operation 202, when the acknowledgement policy AckPolicy is the No_ACK and the interframe transmission mode is the burst mode, the MAC layer 120 has to calculate the value of the overhead AckOverhead according to a preamble type. Therefore, in operation 204, the MAC layer 120 checks whether or not a data rate is larger than 200 Mbps (200 Mbps<DataRate). When the data rate is 200 Mbps or less (0<DataRate≦200 Mbps), in operation 205, the MAC layer 120 obtains the value of the overhead AckOverhead determined according to the acknowledgement policy AckPolicy as 16 µs by adding 14 µs to 2 µs which apply the burst preamble type and the burst interframe space, respectively, and operation 207 is then performed. On the other hand, when the data rate is larger than the 200 Mbps (200 Mbps<DataRate), the MAC layer 120 obtains the value of the overhead AckOverhead determined according to the acknowledgement policy AckPolicy as 12 µs by adding 10 µs to 2 µs which apply the burst preamble type and the burst interframe space, respectively, and operation 207 is then performed.

In operation 207, the MAC layer 120 transmits a single payload from a single MAS and calculates a remaining time MasR (MasR=256*M−AckOverhead).

Thereafter, in operation 208, the MAC layer checks whether or not another single payload can be transmitted within the calculated remaining time after transmitting the single payload (Payload/DataRate≦MasR), namely, there is a time to transmit another payload. When there is the remaining time to transmit another payload after the single payload is transmitted (MasR<P/M), in operation 209, the MAC layer 120 increases the number of frames to be transmitted by 1, and operation 208 is then performed.

On the other hand, when there is no remaining time, in operation 210, the MAC layer 120 checks whether or not the N is 0. When the N is 0 (N=0 & MasR<P/M), the MAC layer 120 increases the parameter M that is the number of continuous MASs by 1 in operation 211, sets the continuous MASs according to the value of the parameter M in operation 212, and transmits a single payload and calculates a remaining time in operation 208.

As a result of the checking in operation 210, when the N is not 0 (1≦N & MasR<P/M), since the MAC layer 120 cannot transmit another payload within the remaining time, the MAC layer 120 calculates an overhead generated per MAS by adding the overhead AckOverhead included in each frame to the remaining time MasR (MasOverhead=N*AckOverhead+MasR) in operation 213. As described above, in operations 207 to 213, it is determined whether or not a payload can be transmitted at a predetermined data rate in a single MAS according to a payload length of a frame, the number of continuous MASs by 2 or 3 is determined in consideration of a case where a 4095-byte payload that have the maximum payload length is transmitted at the lowest data rate, and the overhead MasOverhead generated per MAS is determined.

Next, in operation 214, the MAC layer 120 calculates the number of frame bits to be transmitted per superframe (BitPerSuperframe=(BW*SuperframePeriod)/1000000), and in operation 215, the MAC layer 120 calculates a requested amount of resource to be allocated per superframe by dividing the calculated number of frame bits by the selected data rate (TimeForSuperframe=BitPerSuperframe/DataRate).

Next, in operation 216, the MAC layer 120 primarily calculates the maximum number of MASs needed to transmit only a payload by using the amount of resource to be allocated per the superframe (FirstNumberOfMAS=Max(TimeForSuperfrmae)/(256*M−MasOverhead). In operation 217, the MAC layer 120 secondarily calculates the number of MASs needed per the superframe in consideration of minimum continuous MASs needed to transmit a single payload (SecondNumberOfMAS=FirstNumberOfMAS*M).

Next, in operation 218, the MAC layer 120 optimizes the number of MASs needed per superframe calculated in the aforementioned operations.

The operations of optimizing the number of MASs needed per superframe will be described in detail with reference to the attached drawings.

Figure 5:
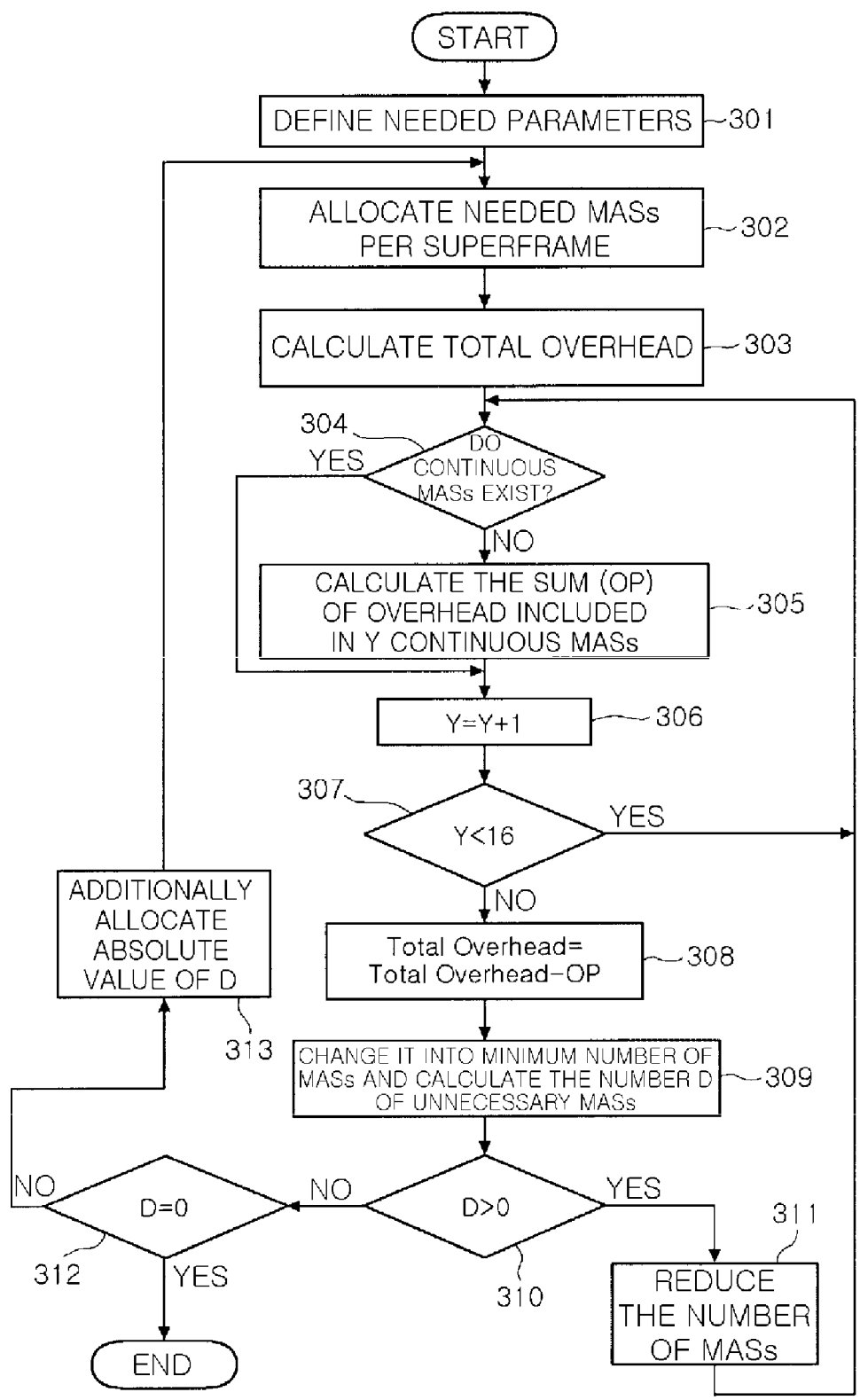
FIG. 5 is a view illustrating operations of optimizing the number of MASs finally needed per superframe performed by a resource allocation system according to an embodiment of the present invention.

FIG. 5 is a view illustrating operations of optimizing the number of MASs finally needed per superframe performed by the resource allocation system according to the embodiment of the present invention.

Referring to FIG. 5, in operation 301, the MAC layer 120 defines needed parameters. Here, as the needed parameters, the number Y of continuous MASs is defined as 1, the number P of Y continuous MASs is defined as 0, an overhead O of the Y continuous MASs is defined as 0, the sum OP of overhead of the Y continuous MASs is defined as 0, D=0, and the final number of MASs FinalNumberOfMAS is defined.

Next, in operation 302, the MAC layer 120 allocates MASs needed per superframe in consideration of the number of continuous MASs calculated in operations illustrated in FIG. 4. For this, the MAC layer 120 uses two schemes. The one scheme is a row reservation scheme of allocating needed MASs to the same position of each of zones excluding beacon transmission zones (MAS number of from 0 to 15). Here, 256 MASs included in the superframe are divided by 16 MASs and 15 zones are managed. The other scheme is a column reservation scheme of allocating needed MASs in order of {zone 4 or zone 12}, {zone 2, zone 6, zone 10, or zone 14}, {zone 1, zone 3, zone 5, zone 7, zone 9, zone 11, zone 13, or zone 15} by perceiving allocation possibility from the zone 8 excluding beacon transmission zones (MAS number of from 0 to 15). Next, in operation 303, the MAC layer 120 calculates the total overhead by using the secondarily calculated number of MASs needed per the superframe SecondNumberOfMAS and the overhead MasOverhead generated per MAS as illustrated in FIG. 4.

Next, in operation 304, the MAC layer 120 checks whether or not Y continuous MASs exist in MASs allocated from a single MAS, and when the Y continuous MASs do not exist, operation 306 is then performed. On the other hand, when the Y continuous MASs exist, in operation 305, values of the P and O are set, and the sum OP of the overhead included in the Y continuous MASs are calculated by using the values (OP=(O*P)+OP).

The MAC layer 120 increases the value of Y by 1 in order to search for the continuous MASs in operation 306 and compares the value of Y with 16 that is the maximum value allocatable to each of zones excluding the beacon zone in operation 307. If the value of Y is smaller than 16, operation 304 is performed, and otherwise, operation 308 is performed. Accordingly, in operation 308, a difference between the calculated sum OP of overhead and the total overhead TotalOverhead is calculated (TotalOverhead=TotalOverhead−OP). By using the value of the overhead reduced by the calculation, the MAC layer 120 converts the MAS into the minimum number of MASs and calculates the number D of unnecessary MASs by using the following Equation 1.

FinalNumberOfMAS=SecondNumberOfMAS−Min [TotalOverhead/256]

D=SecondNumberOfMAS−SecondNumberOfMAS

SecondNumberOfMAS=FinalNumberOfMAS     [Equation 1]

In operation 310, it is determined whether the value D calculated by Equation 1 is a negative or positive number. As a result of the determining, when the value D is a positive number (D>0), the MAC layer 120 reduces the continuous MASs in operation 311 and operation 304 is performed in order to inspect suitability of re-allocated MASs. Here, when the MAC layer 120 uses the row reservation scheme, the MAC layer 120 excludes the number of D from the MAS number by decreasing the MAS number in descending order of the MAS number by 1 in the zone having a large number of continuous MASs. When the MAC layer 120 uses the column reservation scheme, the MAC layer 120 excludes the number of D from the MAS number by decreasing the MAS number by 1 in ascending order of the MAS number in the zone having a large number of continuous MASs.

As a result of the determining in operation 310, when the value D is not a positive number, it is determined whether or not the value D is 0 (D=0). When the value D is 0, the operation is terminated, and when the value D is a negative number, an absolute value of the D is additionally allocated to the number of needed MASs in operation 313. Thereafter, operation 302 is then performed in order to perform the resource allocation again.

Figure 6:
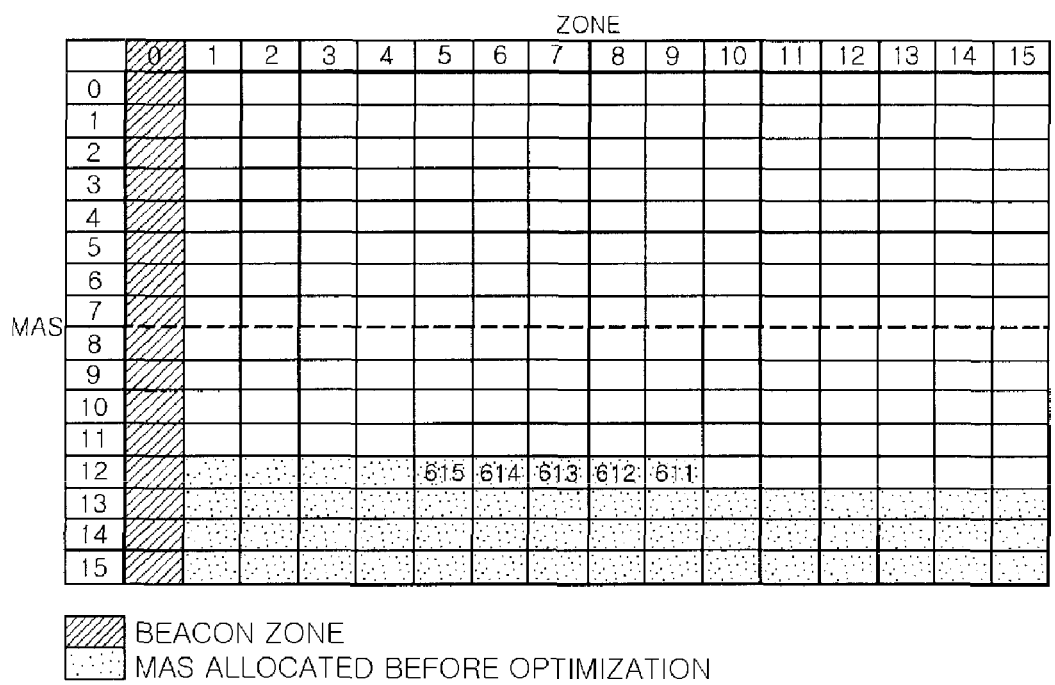
FIG. 6 is a view illustrating an example of optimally performing resource allocation according to a row reservation scheme according to an embodiment of the present invention.
Figure 7:
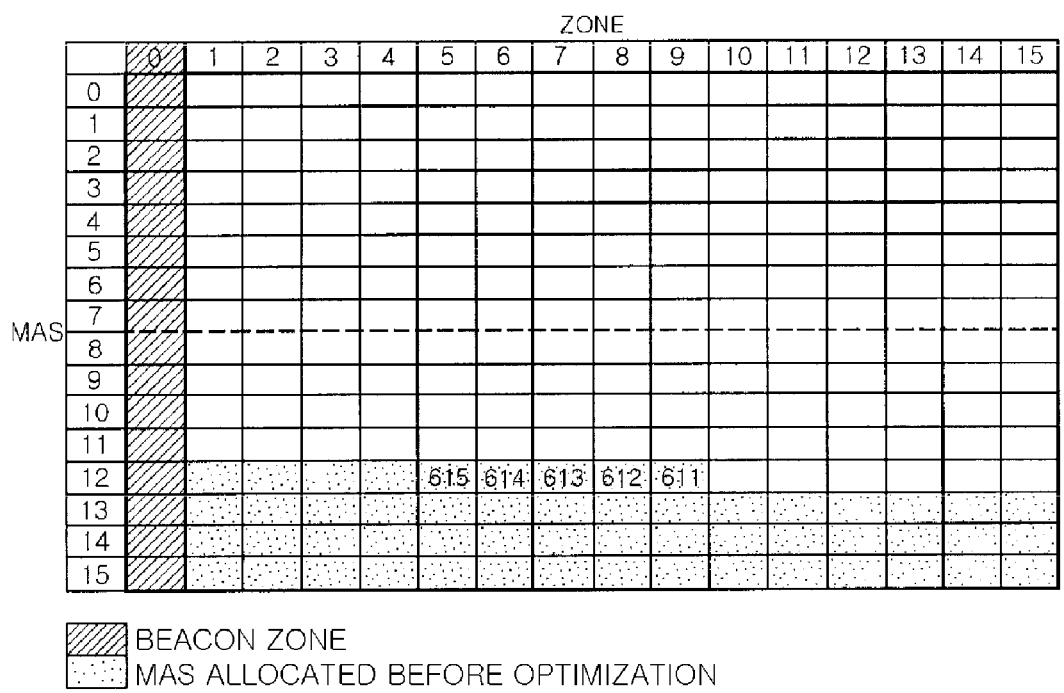
FIG. 7 is a view illustrating an example of optimally performing resource allocation according to a column reservation scheme according to an embodiment of the present invention.

Accordingly, the number of MASs needed per superframe is optimized in the aforementioned operations, and the resource allocation in the distributed MAC can be optimally performed. The embodiment is illustrated in FIGS. 6 and 7. Here, FIG. 6 illustrates an example applying the row reservation scheme. Reference numerals 611 to 615 denote MASs canceled to be allocated according to the optimization operations illustrated in FIG. 5, and the cancellation is performed in ascending order from 611 to 615. FIG. 7 illustrates an example applying the column reservation scheme. The cancellation is performed in ascending order from 711 to 715.

Accordingly, the MAC layer determines a payload length of a transmission frame, a data rate, an acknowledgement policy, an interframe space, a preamble type, and the like by using information supported by the physical layer according to a request of the MAC client, so that only a needed wireless resource is optimally allocated to each device in the WPAN. Therefore, waste of the wireless resource in the WPAN is prevented, and an efficiency of the resource can be improved.

While the present invention has been shown and described in connection with the exemplary embodiments, it will be apparent to those skilled in the art that modifications and variations can be made without departing from the spirit and scope of the invention as defined by the appended claims.

What is claimed is:

1. An optimum resource allocation method in medium access control of distributed scheme in a wireless personal area network in which a plurality of devices are wirelessly connected to each other, comprising:
    calculating an acknowledgement time overhead needed for an acknowledgement policy;
    calculating a per-medium access slot (MAS) time overhead generated per medium access slot (MAS) by using the calculated acknowledgement time overhead and a time amount of medium access slots (MASs) which remains after a frame is transmitted;
    determining by each of the plurality of devices a first number of MASs primarily needed per superframe by using the calculated per-MAS time overhead; and
    optimizing the determined first number of MASs to obtain an optimized number of MASs that are finally needed per superframe to allocate a resource, by calculating a continuous-MAS time overhead generated during a plurality of sets of continuous MASs.

2. The optimum resource allocation method of claim 1, further comprising:
    checking whether or not another payload can be transmitted by calculating a time that remains after a single payload in a single MAS is transmitted;
    when the single payload cannot be transmitted in the single MAS, checking whether or not another payload can be transmitted by calculating a time that remains, from a total time of the single MAS and another MAS continuous from the single MAS, after the single payload is transmitted; and
    when the single payload cannot be transmitted in a number of continuous MASs, increasing the number of continuous MASs and checking whether or not another payload can be transmitted by calculating a time that remains, from a total time of the increased number of continuous MASs, after the single payload is transmitted.

3. The optimum resource allocation method of claim 2, wherein, when another payload cannot be transmitted within a time which remains after a single payload is transmitted in the single MAS, the per-MAS time overhead is calculated by adding the acknowledgement time overhead included per the frame and a time amount that remains from the single MAS after the frame is transmitted.

4. The optimum resource allocation method of claim 1, wherein the calculating the acknowledgement time overhead includes:
    when there is no acknowledgement for the acknowledgement policy and an interframe transmission mode is a burst mode, determining a value of the acknowledgement time overhead according to a burst preamble type, an interframe space and a data rate of the frame, and
    when there is acknowledgement for the acknowledgement policy and the interframe transmission mode is a normal mode, determining the value of the acknowledgement time overhead according to a normal preamble type.

5. The optimum resource allocation method of claim 1, wherein the determining the first number of MASs needed per superframe includes:
    calculating a number of frame bits to be transmitted per superframe according to a predetermined resource request allocation amount;
    calculating a time to be allocated per superframe by dividing the calculated number of frame bits by a data rate of the frame, and
    determining the first number of MASs primarily needed per superframe by using the calculated time to be allocated per superframe excluding the calculated per-MAS time overhead.

6. The optimum resource allocation method of claim 1, wherein the optimizing the determined first number of MASs to obtain the optimized number of MASs includes:
    determining a second number of MASs needed per superframe according to a minimum number of continuous MASs for transmitting a single payload,
    allocating MASs needed per superframe according to the determined second number of MASs,
    calculating a total time overhead according to the determined second number of MASs needed, the minimum number of continuous MASs for transmitting a single payload, and the calculated per-MAS time overhead,
    when the plurality of sets of continuous MASs exist, calculating a sum of a time overhead included in each set of continuous MASs and obtaining a difference between the sum and the calculated total time overhead,
    calculating a number of unnecessary MASs according to the obtained difference, and
    performing optimization per superframe according to the calculated number of unnecessary MASs.

7. The optimum resource allocation method of claim 6, wherein the allocated MASs needed per superframe are located in a same position of each of predetermined zones of a superframe excluding beacon transmission zones, by using a row reservation scheme.

8. The optimum resource allocation method of claim 7, wherein
    256 MASs are included per superframe,
    the 256 MASs are divided into groups of 16 MASs to form 16 zones, and
    15 zones among the 16 zones are managed.

9. The optimum resource allocation method of claim 6, wherein the allocated MAS needed per the superframe are located in predetermined zones of a superframe excluding beacon transmission zones, in a predetermined order starting from a middle-numbered zone of the predetermined zones, by using a column reservation scheme.

10. The optimum resource allocation method of claim 9, wherein
    256 MASs are included per superframe,
    the 256 MASs are divided by 16 MASs to form 16 zones, and
    15 zones among the 16 zones are managed.

11. The optimum resource allocation method of claim 6, wherein the performing optimization per superframe includes:
    completing the optimization per superframe when the calculated number of unnecessary MASs is 0, reducing the determined second number of MASs when the calculated number of unnecessary MASs is positive;

additionally allocating a resource corresponding to the calculated number of unnecessary MASs to the MASs needed per superframe when the calculated number of unnecessary MASs is negative.

12. The optimum resource allocation method of claim 11, wherein the reducing the determined second number of MASs when the calculated number of unnecessary MASs is positive includes:

decreasing the determined second number of MASs by 1 in descending order of a medium access slot number in a zone having a large number of continuous MASs when a row reservation scheme is used, and decreasing the determined second number of MASs by 1 in ascending order of the medium access slot number in a zone having a large number of continuous MASs when a column reservation scheme is used.

* * * * *